Oct. 22, 1929.                J. TEDELL                1,732,703
                      TRACTOR HITCH FOR GANG PLOWS
                   Filed Sept. 26, 1925      2 Sheets-Sheet 2
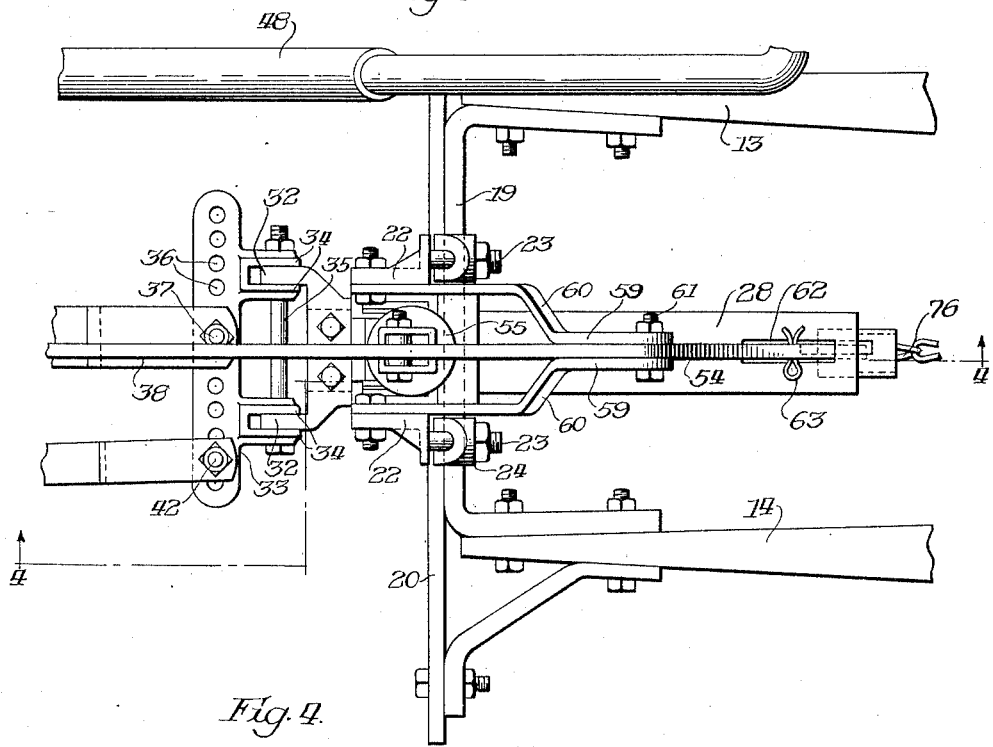
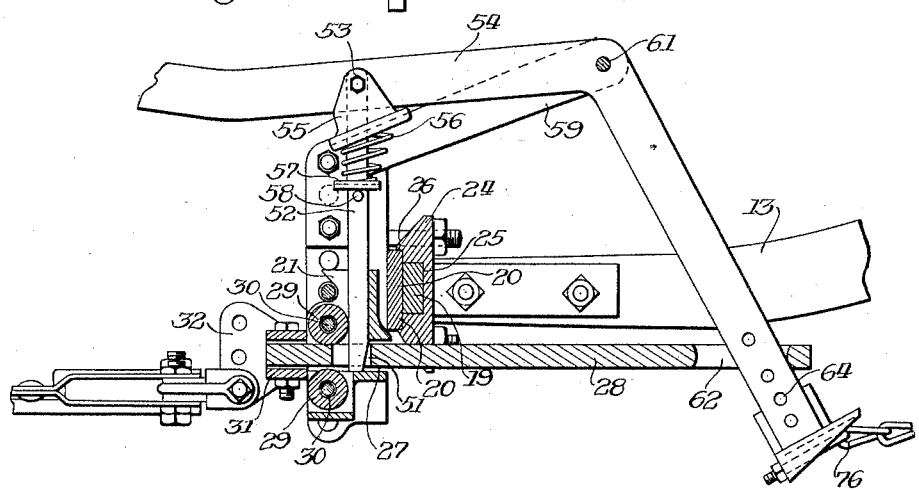

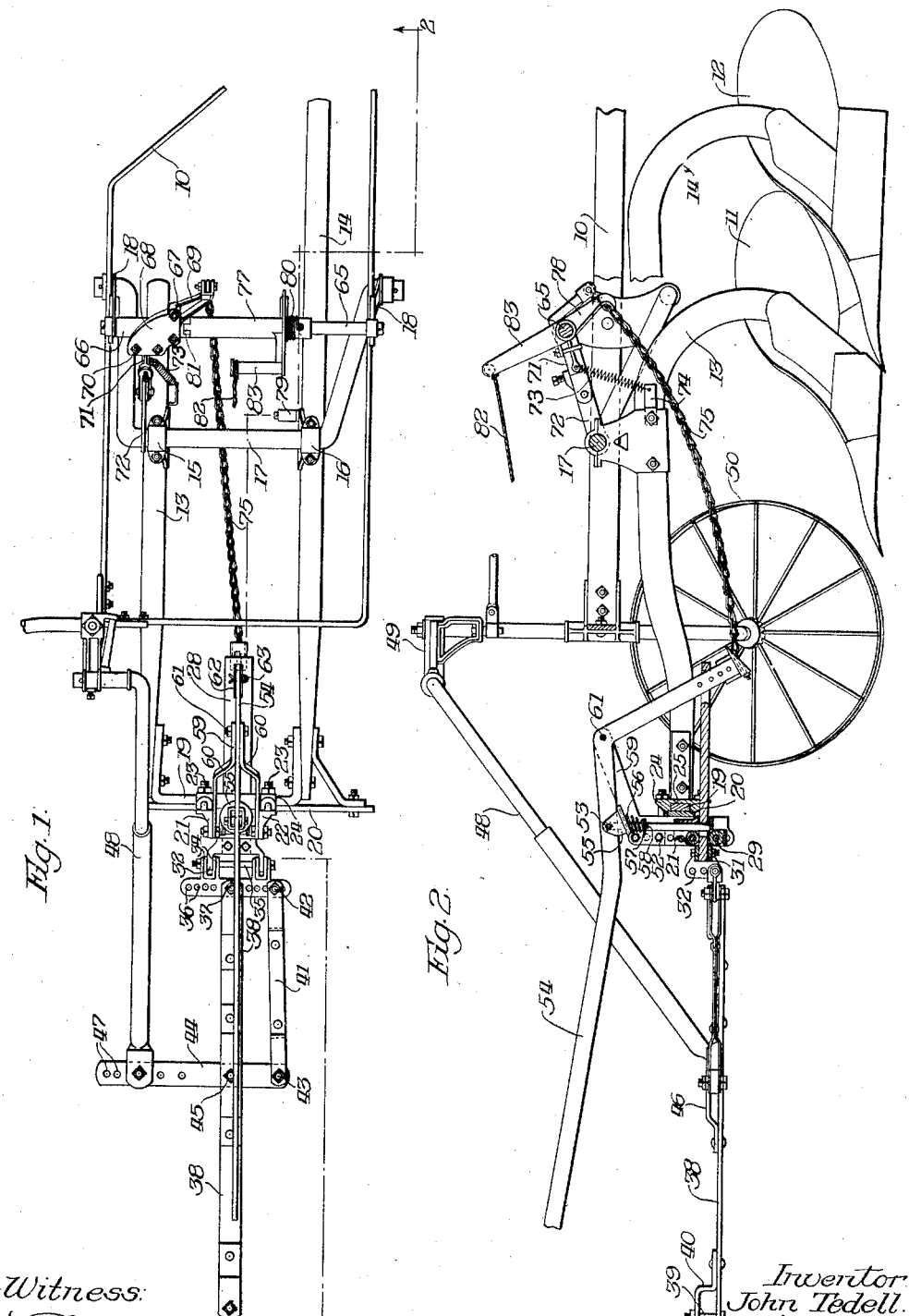

Patented Oct. 22, 1929

1,732,703

UNITED STATES PATENT OFFICE

JOHN TEDELL, OF SPRINGFIELD, ILLINOIS, ASSIGNOR TO MONTGOMERY WARD & CO., INC., OF CHICAGO, ILLINOIS, A CORPORATION OF ILLINOIS

TRACTOR HITCH FOR GANG PLOWS

Application filed September 26, 1925. Serial No. 58,729.

The primary object of the present invention is the provision of novel means for coupling gang plows to tractors wherein the power of the tractors is utilized for elevating the plows from the ground, and the operator freed from exerting manual effort in effecting such elevation.

To the accomplishment of the foregoing general purpose the invention contemplates a tractor hitch or coupling the construction of which is such that with the plows depressed, as when in their normal position for operation in turning over the soil, the operator may initiate a predetermined condition, and, in the establishment of such condition, the tractor, in its further forward movement, acts to raise the plows from the soil to free the same therefrom. This obviates the necessity for stopping and backing the tractor when it is sought to elevate the plows for ease in turning, or for other reasons rendering it desirable to effect such elevation.

Furthermore, the invention also seeks to provide a tractor hitch of the character stated which embodies instrumentalities for holding the plows in their elevated position without release until conditions suggest or require the same, thereby permitting the plows readily to follow movements of the tractor without contact or engagement with the ground. These instrumentalities are coordinated with the other operating elements in such manner as to restore instantaneously the plows to operative relation to the soil when such is required, so that the operator is relieved entirely of the expenditure of effort in the actual shifting of the plows to and from the soil.

Having these general objects in view, and others which will appear as the nature of the improvements is better understood, the invention consists substantially in the novel construction, combination and arrangement of parts hereinafter fully described, illustrated in the accompanying drawings, and finally pointed out in the appended claims.

While the form of the invention made the basis of the present disclosure is believed to be a preferred embodiment thereof, and illustrates a practical adaptation to the uses and purposes for which the same is intended, its presentation in this form is to be considered merely illustrative, and the invention, therefore, is not to be restricted to the form herein shown and described.

In the drawings,

Fig. 1 is a top plan view of a gang plow having a tractor hitch constructed in accordance with the present invention, so much only of the plow structure being shown as is necessary for delineating the relation of the hitch thereto;

Fig. 2 is a longitudinal sectional view, as on the line 2—2, Fig. 1;

Fig. 3 is an enlarged detail plan view of the coupling means of the hitch; and

Fig. 4 is a longitudinal sectional view, as on the line 4—4, Fig. 3.

Referring now in detail to the accompanying drawings, the numeral 10 designates the supporting frame of the plow structure. The details of this frame and the means for adjustment of the plows to vary the depth of penetration of the soil, together with the other accessory adjuncts of the gang plow organization are not referred to, as these details form no part of the present invention. It suffices to point out that in association with the frame 10 there is included the usual plows 11 and 12, including the usual beams 13 and 14. The beams 13 and 14 are suspended by suitable bearings 15 and 16 from a U-shaped bail 17, and the extremities of said bail 17 are journalled for rotation in depending brackets 18 and 19 carried by the supporting frame 10. Thus the beams 13 and 14 are capable of swinging in vertical relation to the supporting frame 10, in the elevating and lowering of the plows 11 and 12 with respect to the soil.

As before pointed out, the present invention is concerned primarily with the means for coupling the plow structure to a tractor in such manner that the power of the tractor may be utilized for the elevation of the plows from the soil, thereby to relieve the operator from the manual effort which ordinarily must be exerted in this movement of the plows. To this end, the forward ends of the beams 13 and 14 have disposed therebetween and are fastened to a U-shaped connecting head 19, the fastening of the beams to the head 19 being effected preferably by bolts or their equivalent. Fitted against the connecting head 19 is a reinforcing bar 20, which is suitably anchored to the plow beams, and arranged at the mid-portion of said reinforcing plate 20 and connecting head 19 is a U-shaped guide head 21 at each side of which is located a vertically extending flanged supporting member 22. A pair of bolts 23, or their equivalent, is carried by each of the supporting members 22, each pair of said bolts passing through a clamp member 24 which is arranged at the rear face of the connecting head 19 opposite to each of the supporting members 22. Each of the clamp members 24 is cut away to form a recess 25 into which the connecting head 19 fits, and also is cut away to provide a recess 26 for receiving the reinforcing bar 20. With the threaded ends of the bolts 23 fitted in the clamp members 24, the tightening of the nuts of said bolts will bind the supporting members 22 and the clamp members 24 into close engagement with the connecting head 19 and the reinforcing bar 20, thus effectually holding the supporting members 22 on said connecting head and reinforcing bar.

The rear face of the guide head 21 has an opening 27 formed therein, which opening receives the forward end of a draft plate 28. The plate 28 has a sliding movement in the opening 27 as will later appear.

Disposed transversely of the guide head 21, and arranged above and below the plate, is a pair of bearing rollers 29. These rollers are supported by bolts 30, said bolts also passing through the sides of the guide head 21 and the flanged supporting members 22, and thus forming not only the journals upon which the rollers 29 rotate, but also the connecting means for holding the guide head 21 and the flanged members 22 in assembled relation. The rollers 29 are spaced apart sufficiently to accommodate free movement of the draft plate 28 therebetween. This draft plate also has positioned at its forward end a coupling head 31 which has parallel spaced perforated attaching ears 32. To the coupling head 31 is connected a clevis bar 33 having at its rear edge two pairs of spaced perforated lugs 34, each pair of these lugs receiving therebetween one of the attaching ears 32 of the coupling head 31, and being held in such engagement by a hinge bolt 35 which passes through said ears 32 and lugs 34.

The clevis bar 33 has a series of perforations 36 formed throughout its length, and pivotally connected, as by a bolt 37, to said clevis bar, in any one of said openings 36, is a draft bar 38. A coupling pin 39 is carried at the forward end of said draft bar 38, being fitted into a coupling bracket 40, thereby permitting the draft bar 38 to be connected to the draft rigging of a tractor.

A connecting link 41 has its rear end pivoted, as by a bolt 42, or its equivalent, to the clevis bar 33 in any one of the openings 36 thereof, the forward end of the connecting link 41 being pivoted, as at 43, to one end of an equalizing bar 44. To this equalizing bar 44 is pivoted the draft bar 38, as by a bolt 45, said bolt 45 passing through a loop 46 the ends of which are connected to the draft bar 38 and which spans the equalizing bar 44. The end of the bar 44 opposite to the end to which the link 41 is connected has a series of aligned openings 47 formed therein, and adjustably mounted on said perforated end of the bar 44 is the forward end of a telescopic stay bar 48. The upper end of the stay bar 48 is connected to a bracket 49 at the top of the arbor of a furrow wheel 50 which is included in the general structure of the plow assembly.

In the forward end of the draft plate 28 is formed an opening 51 which receives the lower end of a coupling pin 52. When the pin 52 is positioned within the opening 51 pull on the draft bar 38, exerted on the draft plate 28 through the connections intermediate of the latter and the draft bar 38, will be effectual to draw the plow structure forwardly, and cause the same to follow the movements of the tractor to which the plow structure is hitched. This, of course, is the normal relation of the parts just described when the plows of the gang are operating on the soil.

The upper end of the coupling pin 52 is pivotally connected, as by a bolt 53, or its equivalent, to a bell crank lever 54, the long arm of which extends forwardly over the draft bar 38 and terminates at a point in such proximity to the tractor as to be conveniently accessible for operation by the tractor driver. Surrounding the upper end of the pin 52, and provided with oppositely disposed spaced ears which receive the lever 54 and are fulcrumed to the lever by the bolt 53, is a swinging head 55. A coil spring 56 surrounds the pin 52, the upper end of said spring abutting against the under face of the head 55 and its lower end contacting with a collar 57, which is held against downward movement on the pin 52 by a stop pin 58. Thus the coupling pin 52 may swing in relation to the operating lever 54, but without too great freedom of movement, so that the proper relation between the pin 52 and the lever 54, to hold the lower end of the pin 52 in proper relation to the guide head 21, is maintained. The lower end of the pin 52 is positioned within the guide head 21 between the rear wall thereof and the upper roller 29. This provides a rolling contact for the pin with the roller 29 in order to afford easy movement of the pin 52 when projected into and removed from the slot 51 of the draft plate 28.

Mounted upon each of the flanged supporting members 22, and suitably fastened thereto, is a rearwardly inclined supporting bar 59. By reference to Fig. 3, it will be observed that each of the bars 59 has a lateral offset 60 so as to position the rear ends of these bars in closely spaced relation to each other. The bell crank lever 54 fits between the rear ends of the bars 59, and is fulcrumed therein by a bolt 61. The lower extremity of the short arm of the lever 54 passes through a slot 62 formed in the rear end of the draft plate 28, and is held in operative relation to said plate by a pair of cotter pins 63, or their equivalent, one of said pins being positioned at the upper and lower sides of the plate 28. For this purpose, and to permit the connection of the short arm of the lever 54 with the plate 28 under different adjustments, said arm is provided with a series of openings 64 for the reception of the cotter pins 63.

Spanning the supporting frame 10 is a non-rotatable rod 65 the ends of which are suitably mounted at the sides of the frame 10. On one end of said rod 65 is located a sleeve 66 which has limited rotation on said rod 65. Clamped to the sleeve 66, as by a U-shaped clip 67 is a crank plate 68 from the rear end of which extends a depending attachment arm 69. Also connected to the crank plate 68, as by a U-shaped clip 70, is one link 71 of a toggle the other link 72 of which is connected to the bail 17 of the plows. When the toggle is straight, as illustrated in Fig. 2, the plows 11 and 12 are in their depressed or lowered position, as when operating on the soil, but when the toggle is broken the plows are raised or elevated, as will presently appear.

A coil spring 73 has one of its ends connected to the toggle, and its other end engaged with an attaching finger 74, or some other point on one of the plow beams. The purpose of this spring is to place the toggle under tension when it is broken, the spring 73 being distended at such time, and exerting a greater pull on the toggle than when the latter is straight.

An operating chain 75 has one of its ends connected to the attaching arm 69, and its other end suitably fastened to the lower end of the short arm of the operating lever 54, as at 76. The function of the chain 75 is to transmit motion from the tractor to the bail 17 of the plows, for the elevation of the plows, as previously explained. This occurs when the coupling pin 52 has been raised upwardly and disengaged from the slot 51, whereupon the pull of the tractor will cause the draft plate 28 to move forwardly, rocking the lever 54 on its fulcrum and pulling the lower or short arm of said lever forwardly to tighten the chain 75 and rock the crank plate 68 so as to raise the link 71, and thereby break the toggle. This results in the raising of the plow beams 13 and 14, and the elevation of the plows 11 and 12 from the ground.

So long as the tractor continues to move forwardly the plows remain in elevated position, but it is desirable to relieve this condition and to maintain the plows elevated regardless of the pull of the tractor. For this purpose the rod 65 is surrounded by a sleeve 77, and said sleeve 77 carries a latch hook 78 adapted to be engaged by an inwardly extending supporting stud 79 carried by one of the plow beams. A coil spring 80 surrounds the sleeve 77, one of the ends of said sleeve being connected to the rod 65, and the other end to the sleeve 77 or the hook 78. A clutch 81 is provided at the contiguous ends of the sleeves 66 and 77, and this clutch permits slight relative rotative movement between these sleeves. On pull being exerted on the chain 75, the sleeve 66 rotates in the manner previously explained to break the toggle, and by means of the clutch 81 this rotation of the sleeve 66 also rotates the sleeve 77 to present the latch hook 78 in the path of upward movement of the stud 79 so as to permit said stud readily to engage the hook 78. The spring 80 affords a yielding contact between the hook 78 and the stud 79, and after the stud 79 has passed over the nose of the hook, the spring 80 asserts itself to force the hook under the stud 79, and thereby prevent the stud 79 moving downwardly.

So long as the latch hook 78 remains in engagement with the stud 79, the plows will remain in elevated position, but if the latch hook 78 be released from the stud 79 the plows will move downwardly by gravity, and again resume their operative relation with respect to the soil. The unlatching of the hook 78 may be accomplished by the tractor driver, a cable 82 being provided for that purpose. One end of this cable is connected to a crank arm 83, carried by the sleeve 77, its other end being extended to a point where it is conveniently accessible by the tractor driver.

In the operation of the hereinbefore described hitch or coupling, assuming the tractor to be connected to the draft bar 38, and the parts positioned as illustrated in Figs. 2 and 4, it is apparent that the forward movement of the tractor is followed by the forward movement of the plow assembly, and the plows operate to turn over the soil. When it is desired to elevate the plows, as when turning at the end of a furrow, or for other reasons requiring such elevation, the tractor driver grasps the forward end of the operating lever 54 and raises the same sufficiently to move the pin 52 out of engagement with the slot 51. It is to be noted that the length of the slot 62 at the rear end of the draft plate 28 is sufficient to permit this release of the pin 52 without, in turn, moving the plate 28 forwardly, and also without perceptibly tensioning the chain 75. The plate 28 now moves forwardly under the pull of the tractor, the rear end of the slot 62 contacting the short arm of the lever 54, and swinging the same forwardly to a sufficient extent to tension the chain 75. When this has become tensioned, and the plate 28 continues to move forwardly, the sleeve 66 is rotated by the attaching arm 69, and the toggle constituted by the links 71 and 72 becomes broken. This breaking of the toggle raises the bail 17, and the plow beams move upwardly. In such upward movement the stud 79 moves into engagement with the latch hook 78, as previously explained, thereby holding the plows in elevated position and freeing the same from engagement with the soil. The tractor now may be turned, the plows having been elevated by the power of the tractor as distinguished from the manual manipulation usually necessary for this purpose. Not until the hook 78 is freed from engagement with the stud 79 can the plows be lowered. Such lowering may be accomplished by the tractor driver exerting pull on the cable 82 which disengages the latch hook 78 by rotation of the sleeve 77, and with this disengagement effected the plows will fall by gravity. In the descent of the plows, the distended spring 73 exerts its pull upon the toggle members 71 and 72, and the toggle is straightened to the position illustrated in Fig. 2.

If when it is desired to lower the plows downward pressure be applied to the forward end of the lever 54, relative movement will be effected between the plow frame and the draft plate 28 to bring the slot 51 of the latter into registry with the lower end of the coupling pin 52, and in this movement the chain 75 will become slack. Resistance to rotation of the sleeve 66 being thus removed, the contraction of the spring 73 will straighten the toggle, and in the rotation of the sleeve 66 the clutch 81 will effect rotation of the sleeve 77 so as to release the latch hook 78 from its engagement with the stud 79. The descent of the plows will then follow.

It will be understood, of course, that the herein described invention is applicable to other types of agricultural machines as well as gang plows, so that the implement with which the same is employed does not necessarily need to be a plow of the gang type. A horse-drawn gang plow may be easily transformed into a tractor plow, and vice versa, thus extending the utility of the invention, and the operation of the latter is such that the plows either may be elevated or lowered from their elevated positions, without the necessity of stopping the tractor.

I claim:

1. In a hitch of the class described, the combination with a wheeled frame, a member mounted for vertical movement thereon, and a draft element, of a connection between said element and said member slidably mounted on said member for effecting upward movement of said member on forward movement of the slidable connection relatively to said member, a coupling pin engageable with said slidable connection for restraining forward movement of said slidable connection, and a manually operated lever connected to said pin and slidable connection for releasing the latter from engagement with said slidable connection.

2. In a hitch of the class described, the combination with a wheeled frame, a member mounted for vertical movement thereon, and a draft element, of a connection between said element and said member slidably mounted on said member for effecting upward movement of said member on forward movement of the slidable connection relatively to said element, a pin engageable with said slidable connection for restraining forward movement of said slidable connection, a manually operable lever connected to said pin for releasing the same from its engagement with said slidable connection, and means independent of the slidable connection for locking said member in its elevated position.

3. In a hitch of the class described, the combination with a wheeled frame, a member mounted for vertical movement thereon, and a draft element, of a connection between said element and said member slidably mounted on said member for effecting upward movement of said member on forward movement of the slidable connection relatively to said element, a pin engageable with said slidable connection for restraining forward movement of said slidable connection, a manually operable lever connected to said pin for releasing the same from its engagement with said slidable connection, means for locking said member in its elevated position, and separate means for releasing said locking means.

4. In a hitch of the class described, the combination with a frame, a member mounted on said frame for vertical movement thereon, and a draft element, of a connection between said element and said member slidably arranged relative to said member for effecting upward movement of said member on forward movement of the slidable connection relatively to said member, a coupling pin engageable with said slidable connection for restraining forward movement of the slidable connection, a manually operable lever for releasing said pin from its engagement with said slidable connection, said lever being operatively related to said slidable connection for actuation by the latter when the slidable connection is moved forwardly, actuating means associated with said member for moving the latter to elevated position, and connections between said lever and said actuating means for operating the latter when said lever is actuated by said slidable connection.

5. In a hitch of the class described, the combination with a frame, a member mounted on said frame for vertical movement thereon, and a draft element, of a connection between said element and said member slidably arranged relative to said member for effecting upward movement of said member on forward movement of the slidable connection relatively to said member, a coupling pin engageable with said slidable connection for restraining forward movement of the slidable connection, a manually operable lever for releasing said pin from its engagement with said slidable connection, said lever being operatively related to said slidable connection for actuation by the latter when the slidable connection is moved forwardly, actuating means associated with said member for moving the latter to elevated position, connections between said lever and said actuating means for operating the latter when said lever is actuated by said slidable connection, and means for locking said member in its elevated position.

6. In a hitch of the class described, the combination with a frame, a member mounted on said frame for vertical movement thereon, and a draft element, of a connection between said element and said member slidably arranged relative to said member for effecting upward movement of said member on forward movement of the slidable connection relatively to said member, a coupling pin engageable with said slidable connection for restraining forward movement of the slidable connection, a manually operable lever for releasing said pin from its engagement with said slidable connection, said lever being operatively related to said slidable connection for actuation by the latter when the slidable connection is moved forwardly, actuating means associated with said member for moving the latter to elevated position, connections between said lever and said actuating means for operating the latter when said lever is actuated by said slidable connection, means for locking said member in its elevated position, and means for releasing said locking means.

7. In a hitch of the class described, the combination with a frame, a plow beam vertically movable thereon, and a draft element, of a connection between said element and said beam slidably mounted on said beam for effecting upward movement of said plow beam on forward movement of the slidable connection relatively to said plow beam, a coupling pin engageable with said slidable connection for restraining forward movement of said slidable connection, and means for releasing said coupling pin from its engagement with said slidable connection.

8. In a hitch of the class described, the combination with a frame, a plow beam vertically movable thereon, and a draft element, of a connection between said element and said beam slidably mounted on said beam for effecting upward movement of said plow beam on forward movement of the slidable connection relatively to said plow beam, a coupling pin engageable with said slidable connection for restraining forward movement of the slidable connection, and a manually operable lever connected to said coupling pin for releasing the same from its engagement with the slidable connection.

9. In a hitch of the class described, the combination with a wheeled carriage support, a vertically movable plow beam, a frame and a pivoted bail for supporting said beam on said frame from said carriage support, of a draft element, means intermediate said vertically movable plow beam and said element for effecting swinging movement of said bail to raise the plow beam on forward movement of the draft element relatively to said plow beam, said means including a bell crank lever having movable engagement with the draft element, said means being carried by said beam, and means for restraining forward movement of said draft element.

10. In a hitch of the class described, the combination with a wheeled carriage support, a frame, a vertically movable plow beam, and a pivotally mounted bail for supporting the same from said carriage support on said frame, of a draft element, connecting means intermediate said plow beam and said element slidable relative to said beam for swinging the bail to raise the plow beam on forward movement of the draft element relatively to said plow beam, said means including a separate slidable draft plate and a bell crank lever having one end passing through the draft plate and movable therewith, and means for restraining movement of said slidable plate.

11. In a hitch of the class described, the combination with a wheeled carriage support, a frame, a plow beam, and a pivotally mounted bail for supporting the same from said carriage support on said frame, of a draft element, a connection intermediate said plow beam and said element slidable relative to said beam for swinging said bail to elevate the plow beam on forward movement of the slidable connection relatively to said plow beam, said connection being carried by said beam, a coupling pin engageable with said slidable connection for restraining forward movement of the latter, and means for releasing said coupling pin from its engagement with the slidable connection.

12. In a hitch of the class described, the combination with a wheel supported frame, a vertically movable plow beam, and a pivotally mounted bail for supporting the plow beam, of a draft element, a draft plate intermediate said plow beam and said draft element for swinging said bail to raise the plow beam on forward movement of the draft plate relatively to said plow beam, said draft plate being carried by said beam, and means for restraining forward movement of said draft plate.

13. In a hitch of the class described, the combination with a wheel supported frame, a vertically movable plow beam, a pivotally mounted bail for supporting said plow beam, and a toggle connection for raising and lowering said plow beam, of a draft element, means intermediate said draft element and said toggle connection for actuating the latter to raise the plow beam on forward movement of the draft element relatively to said plow beam, and means for restraining forward movement of said draft element.

14. In a hitch of the class described, the combination with a wheeled carriage support, a vertically movable plow beam, a pivotally mounted bail for supporting said plow beam from said support, and a toggle connection for raising and lowering said plow beam, of a draft element, means intermediate said draft element and said toggle connection for actuating the latter to raise the plow beam on forward movement of the draft element relatively to said plow beam, means for restraining forward movement of said draft element, and means for locking the plow beam in elevated position.

15. In a hitch of the class described, the combination with a wheeled carriage support, a vertically movable plow beam, a pivotally mounted bail for supporting said plow beam, from said support, and a toggle connection for raising and lowering said plow beam, of a draft element, means intermediate said draft element and said toggle connection for actuating the latter to raise the plow beam on forward movement of the draft element relatively to said plow beam, means for restraining forward movement of said draft element, means for locking the plow beam in elevated position, and means for releasing said locking means.

16. In a device of the character described comprising a frame supported by a wheel carriage, and a member supported from the frame by a bracket and toggle lever construction, draft means connected to said member for drawing the latter, and means interconnecting said draft means and toggle levers for moving the member vertically with respect to the support.

17. In combination, a support, a member vertically movable with respect to the support, draft means connected to said member, and additional means connecting said draft means and the vertically movable member for moving the member upon forward movement of the draft means, said additional means including a toggle joint.

18. In a device of the character described comprising a wheeled frame, a member supported from the frame for vertical movement, a draft bar, a separate draft plate slidable with respect to the member, means for effecting upward movement of the member on movement of the draft plate with respect to the frame, said lifting means comprising a bell crank lever pivoted on the member and passing through an aperture provided in the draft plate and connecting means between the end of the lever and the member.

In testimony whereof I have hereunto signed my name.

JOHN TEDELL.